United States Patent
Horling et al.

(10) Patent No.: US 7,827,170 B1
(45) Date of Patent: Nov. 2, 2010

(54) SYSTEMS AND METHODS FOR DEMOTING PERSONALIZED SEARCH RESULTS BASED ON PERSONAL INFORMATION

(75) Inventors: Bryan C. Horling, Tuckahoe, NY (US); Oren E. Zamir, Los Altos, CA (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 11/846,353

(22) Filed: Aug. 28, 2007

Related U.S. Application Data

(60) Provisional application No. 60/894,672, filed on Mar. 13, 2007, provisional application No. 60/894,673, filed on Mar. 13, 2007.

(51) Int. Cl.
*G06F 17/30* (2006.01)

(52) U.S. Cl. ...................................... 707/722

(58) Field of Classification Search ............... 707/2, 707/5, 722; 709/238
See application file for complete search history.

(56) References Cited

U.S. PATENT DOCUMENTS

| | | | | |
|---|---|---|---|---|
| 5,724,567 | A | 3/1998 | Rose et al. | 395/602 |
| 5,754,939 | A | 5/1998 | Herz et al. | 455/4.2 |
| 6,012,051 | A | 1/2000 | Sammon, Jr. et al. | 706/52 |
| 6,182,068 | B1 | 1/2001 | Culliss | 707/5 |
| 6,285,999 | B1 | 9/2001 | Page | 707/5 |
| 6,321,228 | B1 | 11/2001 | Crandall et al. | 707/10 |
| 6,327,590 | B1 | 12/2001 | Chidlovskii et al. | 707/5 |
| 6,338,066 | B1 | 1/2002 | Martin et al. | 707/10 |
| 6,385,619 | B1 | 5/2002 | Eichstaedt et al. | 707/104 |
| 6,421,675 | B1 | 7/2002 | Ryan et al. | 707/100 |
| 6,493,702 | B1 | 12/2002 | Adar et al. | 707/3 |
| 6,535,888 | B1 | 3/2003 | Vijayan et al. | 707/104 |

(Continued)

FOREIGN PATENT DOCUMENTS

EP 1 050 830 A2 11/2000

(Continued)

OTHER PUBLICATIONS

"Guide to Custom Search Engines (CSEs)," http://web.archive.org/web/20061027235927/http://www.customsearchguide.com, Oct. 27, 2006, 1 page.

(Continued)

*Primary Examiner*—Etienne P LeRoux
(74) *Attorney, Agent, or Firm*—Morgan, Lewis & Bockius LLP

(57) ABSTRACT

An information server identifies a list of search results associated with a search query from a user. Each search result has an initial position in the list. The information server then identifies a user profile associated with the user. In some embodiments, the user profile includes a set of user-preferred search results that is determined at least in part from the user's search history and one or more supplemental search results that are deemed similar to at least one of the user-preferred search results. Among the list of search results, the information server identifies one or more search results that are associated with the supplemental search results. Finally, the information server reorders the list of search results by moving each of the identified search results from its initial position by an offset and then provides the reordered list of search results to the user.

29 Claims, 11 Drawing Sheets

U.S. PATENT DOCUMENTS

| | | | |
|---|---|---|---|
| 6,606,619 B2 | 8/2003 | Ortega et al. | 707/2 |
| 6,836,773 B2 | 12/2004 | Tamayo et al. | 707/6 |
| 6,868,525 B1 | 3/2005 | Szabo | 715/738 |
| 6,873,982 B1 | 3/2005 | Bates et al. | 707/5 |
| 6,892,198 B2 | 5/2005 | Perisic et al. | 707/5 |
| 6,895,406 B2 | 5/2005 | Fables et al. | 707/102 |
| 6,912,505 B2 | 6/2005 | Linden et al. | 705/14 |
| 6,959,319 B1 | 10/2005 | Huang et al. | 709/203 |
| 7,031,961 B2 | 4/2006 | Pitkow et al. | 707/4 |
| 7,100,111 B2 | 8/2006 | McElfresh et al. | 715/517 |
| 7,207,062 B2 | 4/2007 | Brustoloni | 726/13 |
| 7,240,049 B2 | 7/2007 | Kapur | 707/3 |
| 2002/0024532 A1 | 2/2002 | Fables et al. | 345/700 |
| 2002/0073065 A1 | 6/2002 | Inaba et al. | 707/1 |
| 2002/0123988 A1 | 9/2002 | Dean et al. | 707/3 |
| 2002/0156917 A1* | 10/2002 | Nye | 709/238 |
| 2002/0198882 A1 | 12/2002 | Linden et al. | 707/10 |
| 2003/0023715 A1 | 1/2003 | Reiner et al. | 709/224 |
| 2003/0149937 A1 | 8/2003 | McElfresh et al. | 715/517 |
| 2004/0034652 A1 | 2/2004 | Hofmann et al. | 707/102 |
| 2004/0044571 A1 | 3/2004 | Bronnimann et al. | 705/14 |
| 2004/0267806 A1 | 12/2004 | Lester | 707/103 |
| 2005/0060389 A1 | 3/2005 | Cherkasova et al. | 709/220 |
| 2005/0071328 A1 | 3/2005 | Lawrence | 707/3 |
| 2005/0071741 A1 | 3/2005 | Archarya et al. | 715/500 |
| 2005/0131866 A1 | 6/2005 | Badros et al. | 707/3 |
| 2005/0144193 A1 | 6/2005 | Henzinger | 707/103 |
| 2005/0222981 A1 | 10/2005 | Lawrence et al. | 707/3 |
| 2005/0240580 A1 | 10/2005 | Zamir et al. | 707/4 |
| 2005/0278317 A1 | 12/2005 | Gross et al. | 707/3 |
| 2006/0004711 A1 | 1/2006 | Naam | 707/3 |
| 2006/0026147 A1 | 2/2006 | Cone et al. | 707/3 |
| 2006/0064411 A1 | 3/2006 | Gross et al. | 707/3 |
| 2006/0074883 A1 | 4/2006 | Teevan et al. | 707/3 |
| 2007/0088692 A1 | 4/2007 | Dean et al. | 707/5 |
| 2007/0088693 A1 | 4/2007 | Lawrence | 707/5 |
| 2007/0094254 A1 | 4/2007 | Cutts et al. | 707/5 |
| 2007/0094255 A1 | 4/2007 | Acharya et al. | 707/5 |
| 2007/0260597 A1 | 11/2007 | Cramer | 707/5 |
| 2008/0140641 A1* | 6/2008 | Wang | 707/5 |

FOREIGN PATENT DOCUMENTS

| | | |
|---|---|---|
| EP | 1107128 A1 | 6/2001 |
| WO | WO 03/107127 A2 | 12/2003 |
| WO | WO 2005/001719 A1 | 1/2005 |
| WO | WO 2005/033979 A1 | 4/2005 |
| WO | WO 2005/055015 A2 | 6/2005 |
| WO | WO 2006/014562 A1 | 2/2006 |

OTHER PUBLICATIONS

"Yahoo! Search Builder-Design Search Box," http://web.archine.org/web/2006813082935/http://builder.search.yahoo.com/m/promo, Aug. 13, 2006, 1 page.

Brin, S., et al., "The Anatomy of a Large-Scale Hypertextual Web Search Engine," *Computer Networks and ISDN Systems*, vol. 30, No. 1-7, Apr. 1998, pp. 107-117.

Cho, J., et al., "Efficient Crawling Through URL Ordering," *Computer Networks and ISDN Systems*, vol. 30, No. 1-7, Apr. 1998, pp. 161-171.

Haveliwala, T.H., "Topic-Sensitive PageRank," *Proc. of the 11th Int'l World Wide Web Conf.*, Honolulu, Hawaii, May 2002.

Jeh, Glen, et al., "Scaling Personalized Web Search," Stanford Univ. Technical Report, 2002.

Joachims, T., et al., "Accurately Interpreting Clickthrough Data as Implicit Feedback," Proceedings of the 28$^{th}$ Annual Int'l ACM SIGIR Conference on Research and Development in Information Retrieval, Aug. 15, 2005, pp. 154-161.

Juan, Y-F, et al., "An Analysis of Search Engine Switching Behavior Using Click Streams," Internet and Network Economics Lecture Notes in Computer Science, vol. 3828, 2005, pp. 806-815.

Pretschner, A., et al., "Ontology Based Personalized Search," *Proc. 11th IEEE Int'l Conf. on Tools with Artificial Intelligence*, Chicago, Illinois, Nov. 1999, pp. 391-398.

Ramachandran, P., "Discovering User Preferences by Using Time Entries in Click-Through Data to Improve Search Engine Results," Discovery Science Lecture Notes in Computer Science, Artificial Intelligence, vol. 3735, 2005, pp. 383-385.

Zhao, M., et al., "Adapting Document Ranking to Users' Preferences Using Click-Through Data," Information Retrieval Technology Lecture Notes in Computer Science, vol. 4182, 2006, pp. 26-42.

International Search Report for International Application No. PCT/US07/065710, mailed Nov. 12, 2007.

International Search Report for International Application No. PCT/US2005/025081, mailed Dec. 2, 2005.

Ding, J., et al., "Computing Geographical Scopes of Web Resources," Proceedings of the 25$^{th}$ VLDB Conf., Cairo, Egypt 2000.

Henzinger, M., "Web Information Retrieval—an Algorithmic Perspective," Lecture Notes in Computer Science, Proceedings of the 8$^{th}$ Annual European Symposium, Saarbruken, Germany, Sep. 2000, pp. 1-8.

* cited by examiner

User-Preferred Search Results 250

| Search Result A | Popularity Metric | — 250-A |
|---|---|---|
| ... | ... | |
| Search Result Z | Popularity Metric | — 250-Z |

Figure 2B

User-Disfavored Search Results 260

| Search Result M | Unpopularity Metric | — 260-M |
|---|---|---|
| ... | ... | |
| Search Result N | Unpopularity Metric | — 260-N |

Figure 2C

Search Result X's Co-Occurrence Table 280

| Search Result T | Similarity Metric | Average Popularity Metric | — 280-T |
|---|---|---|---|
| ... | ... | ... | |
| Search Result W | Similarity Metric | Average Popularity Metric | — 280-W |

Figure 2D

Multiple Users' Search Behaviors Table 290

| | Property 1 | ... | Property R | |
|---|---|---|---|---|
| Search Result 1 | ... | ... | ... | — 290-1 |
| ... | ... | ... | ... | |
| Search Result S | ... | ... | ... | — 290-S |

Figure 2E

SYSTEMS AND METHODS FOR DEMOTING PERSONALIZED SEARCH RESULTS BASED ON PERSONAL INFORMATION

RELATED APPLICATIONS

This application claims priority to U.S. Provisional Application Nos. 60/894,672, filed Mar. 13, 2007, titled "Systems and Methods for Promoting Search Results in Personalized Search," and 60/894,673, filed Mar. 13, 2007, titled "Systems and Methods for Demoting Search Results in Personalized Search," which are incorporated by reference herein in their entirety.

This application is related to U.S. patent application Ser. No. 11/394,620, filed Mar. 30, 2006, entitled "Generating Website Profiles Based on Queries from Websites and User Activities on the Search Results", and U.S. patent application Ser. No. 10/890,854, filed Jul. 13, 2004, entitled "Personalization of Placed Content Ordering in Search Results."

This application is related to U.S. patent application Ser. No. 11/846,346, filed Feb. Aug. 28, 2007, entitled "Systems and Methods for Promoting Personalized Search Results Based on Personal Information," and U.S. patent application Ser. No. 11/846,364, filed Aug. 28, 2007, entitled "Systems and Methods for Producing Personalized Search Results Based on Personal and Collaborative Information," both of which are hereby incorporated by reference in their entirety.

FIELD OF THE INVENTION

The present invention relates generally to the field of search engines in computer network systems, in particular to systems and methods of personalizing search results using a user's search history.

BACKGROUND OF THE INVENTION

Search engines are powerful tools for locating and retrieving documents from the Internet (or an intranet). Traditionally, different users who submit the same search query to a search engine receive the same set of search results. For example, the search engine generates the same set of search results for the search query "apple" irrespective of whether the search query is from a user who is interested in Apple® computers or from a user who is interested in the fruit *malus domestica*. Clearly such search results are likely to include some results of little interest to either user.

In view of the aforementioned, it would be desirable to have a search engine that can customize its search results so as to highlight information items in the search results that are most likely to be of interest to users who submit the search queries. Further, it would be desirable for such a system to operate without explicit input from a user with regard to the user's personal preferences and interests, and for the system to protect the privacy interests of its users.

SUMMARY

In some embodiments, an information server identifies a list of search results associated with a search query from a user. Each search result has an initial position in the list. The information server then identifies a user profile associated with the user. In some embodiments, the user profile includes a set of user-disfavored search results that is determined at least in part from the user's search history. Among the list of search results, the information server identifies one or more search results that are associated with at least one of the user-disfavored search results. Finally, the information server reorders the list of search results by moving each of the identified search results from its initial position by an offset and then provides the reordered list of search results to the user.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

FIGS. 2A through 2E are block diagrams illustrative of data structures associated with the information server in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
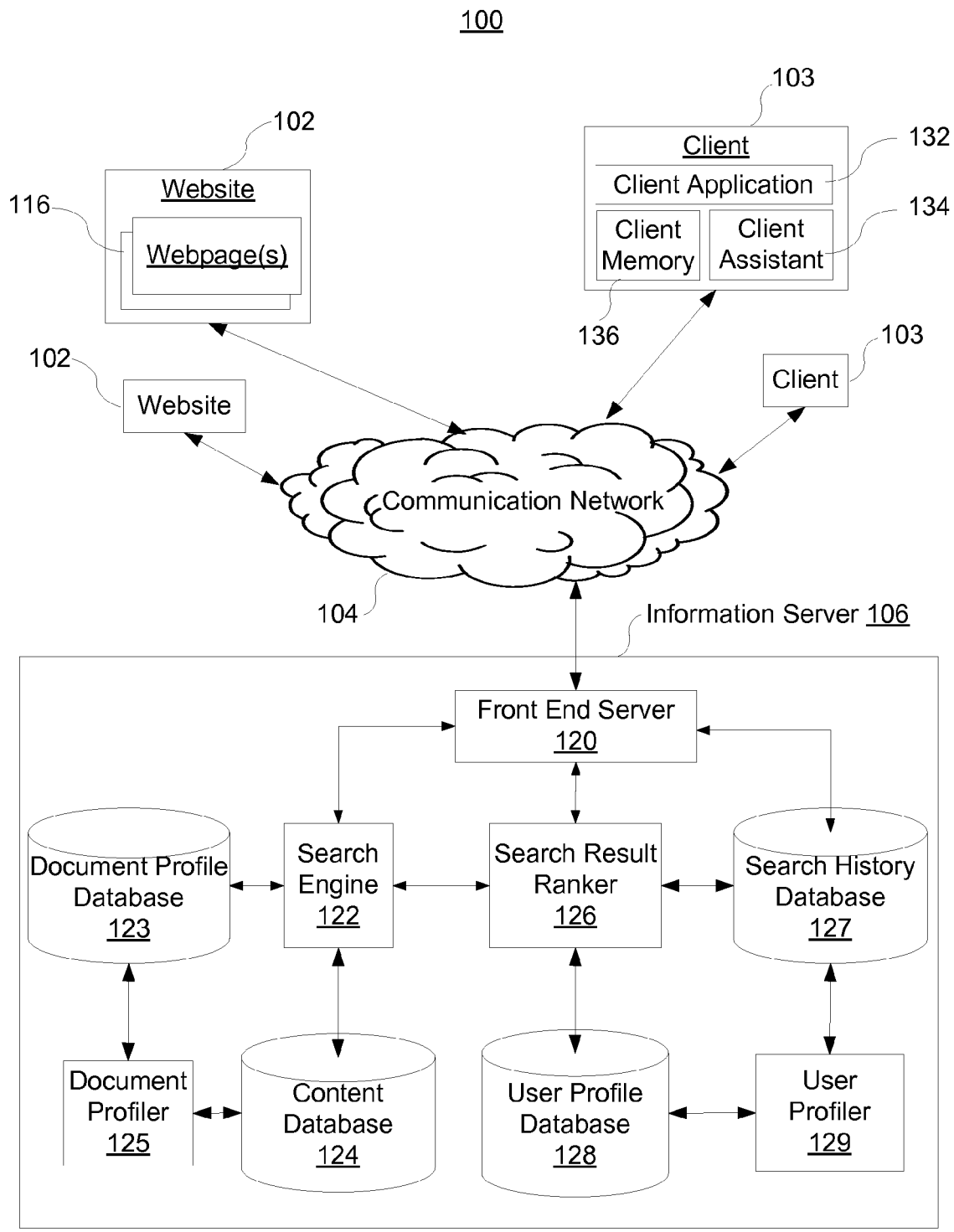
FIG. 1 is a block diagram of an exemplary distributed system that includes a plurality of clients requesting information from an information server in accordance with some embodiments.

FIG. 1 is a block diagram of an exemplary environment 100 for implementing some embodiments of the present invention. One or more websites 102 and clients 103 can be connected to a communication network 104. The communication network 104 can be connected to an information server 106. The information server 106 may include a front end server 120, a search engine 122, a document profiler 125, a user profiler 129, a search result ranker 126, a document profile database 123, a content database 124, a search history database 127, and a user profile database 128.

In some embodiments, the information server 106 contains a subset or superset of the elements illustrated in FIG. 1. Although FIG. 1 shows the information server 106 as a number of discrete items, the figure is intended more as a functional description of the various features which may be present in the information server 106 rather than a structural schematic of the various embodiments. In practice, items shown separately could be combined and some items could be further separated, as would be recognized by one of ordinary skill in the art of designing such systems. For example, the four different databases 123, 124, 127, and 128 shown separately in the figure could be implemented by one, two, or more distinct databases spread over as many servers as needed to store and provide timely access to the data in the databases. The actual number of computers constituting the information server 106 and the allocation of features among the computers may vary from one implementation to another, and may depend in part on the amount of traffic that the information server 106 handles during peak usage periods as well as during average usage periods.

A website 102 is typically a collection of webpages 116 associated with a domain name on the Internet. Each website (or webpage) has a universal resource locator (URL) that uniquely identifies the location of the website (or webpage) on the Internet. Any visitor can visit the website by entering its URL in a browser window. A website can be hosted by a web server exclusively owned by the owner of the domain name or by an Internet service provider wherein its web server manages multiple websites associated with different domain names. Depending on the context, the term "website" as used in this document refers to a logical location (e.g., an Internet or intranet location) identified by a URL, or it refers to a web server hosting the website represented by the URL. For example, some "websites" are distributed over multiple Internet or network locations, but have a shared web server hosting those locations, and in many situations it is logical to consider those network locations to all be part of "a website."

A client 103 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 103 and/or network resources to perform one or more tasks. For example, the client application 132 can be a browser (e.g., the computer program available under the trademark Firefox®) or other type of application that permits a user to search for, browse, and/or use resources (e.g., webpages and web services) at the website 102 from the client 103. The client assistant 134 can be a software application that performs one or more tasks related to monitoring or assisting a user's activities with respect to the client application 132 and/or other applications. For instance, the client assistant 134 assists a user at the client 103 with browsing for resources (e.g., files) hosted by the website 102; processes information (e.g., search results) received from the information server 106; and/or monitors the user's activities on the search results. In some embodiments the client assistant 134 is part of the client application 132, available as a plug-in or extension to the client application 132 (provided, for example, from various online sources), while in other embodiments the client application is a stand-alone program separate from the client application 132. In some embodiments the client assistant 134 is embedded in one or more webpages or other documents downloaded from one or more servers, such as the information server 106. Client memory 136 can store information such as webpages, documents received from the information server 106, system information, and/or information about a user.

The communication network 104 can be any wired or wireless local area network (LAN) and/or wide area network (WAN), such as an intranet, an extranet, or the Internet. It is sufficient that the communication network 104 provide communication capability between the websites 102, the clients 103 and the information server 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to a unit of information or a service that is accessible via a URL and can be, for example, a webpage, a document, a database, an image, a computational object, a search engine, or other online information service.

To receive a set of personalized search results, a user from the client 103 (for example) submits a search request to the information server 106. In some embodiments, the search request may include a search query comprising one or more query terms and unique identifiers of one or more of the following entities: the requesting user and the requesting client 103.

Within the information server 106, the front end server 120 is configured to handle search requests from the clients 103 via their respective connections with the communication network 104. As shown in FIG. 1, the front end server 120 is connected to the search engine 122 and the search engine 122 is connected to the content database 124, respectively. The content database 124 stores a plurality of indexed documents retrieved from different websites 102. Alternately, or in addition, the content database 124 stores an index of documents stored at various websites. In some embodiments, each indexed document is assigned a page rank according to the document's link structure. The page rank serves as a query-independent metric of the document's popularity.

In some embodiments, the front end server 120 passes the search query onto the search engine 122. The search engine 122 then communicates with the content database 124 and the document profile database 123 to select a plurality of information items (e.g., documents) in response to the search query. In some embodiments, the search engine 122 assigns a generic ranking score to each information item based on the item's page rank, the relevant text in the information item, and the search query. The generic ranking score is an indicator of the information item's relevance to the search query.

For ease of discussion, information items will often be referred to as "documents;" but it is to be understood that information items need not be documents, and may include other types or forms of information. The search engine 122 sends to the search result ranker 126 a list of search results responsive to the search query, each search result including a URL identifying the source of a relevant document on the Internet, the document's generic ranking score, and a set of keywords associated with the document. In some embodiments, the list of search results is ordered by their respective generic ranking scores such that each search result has an initial position in the list. For example, the search result having the highest ranking score is the head of the list and the search result having the lowest ranking score is the tail of the list.

In some embodiments, the search result ranker 126 receives from the front end sever 120 a unique identifier identifying the requesting user and uses the user identifier to retrieve a user profile from the user profile database 128. The user profile database 128 stores a plurality of user profiles, each user profile corresponding to a unique user or client 103. As will be described below, the user profile associated with the requesting user includes a set of user-preferred (or user-disfavored) search results, each search result having a popularity metric indicative of the likelihood of a user selection of the search result among a list of search results responsive to a search query.

Using the user profile, the search result ranker 126 first checks whether any search result in the list of search results from the search engine 122 is associated with at least one of the user-preferred search results in the user profile. For each search result that matches a user-preferred search result in the user profile, the search result ranker 126 moves the search result from its current position to a new position in the list based at least in part on the popularity metric associated with the user-preferred search result. If no match is found in the user profile, there is no change to the position of any member in the list of search results prepared by the search engine 122. In this case, the list of search results, or a portion of the list, is returned to the client 103.

Assuming that at least one search result changes its position, the search result ranker 126 then returns the reordered list of search results to the front end sever 120. The front end server 120 then provides the reordered list of search results to the requesting user at the client 103. In some embodiments, a portion of the reordered list of search results (e.g., the top 10, 15 or 20 search results) is returned to the client 103 and displayed to the requesting user through the client application 132. The requesting user, while browsing the displayed search results, may click one or more URL links in the search results to access the documents associated with the URL links.

In some embodiments, the client assistant 134 at the client 103 monitors the requesting user's activities on the search results, e.g., recording the user's selection(s) of the URL links in the search results and/or the mouse hovering time on different URL links. In some embodiments, the client assistant 134 determines a document "dwell time" for a document selected by the user, by measuring the amount of time between the user selection of the corresponding URL link and the user exiting from the document.

In some embodiments, the client assistant 134 includes executable instructions, stored in the webpage(s) containing the search results, for monitoring the user's activities with respect to the search results and transmitting information about the monitored user activities back to the information server 106. In some embodiments, the search results are served to the requesting users with an embedded client assistant 134 that sends information about the user activities on the search results to the information server 106. The information server 106, in turn, stores information about these user activities in the search history database 127.

In sum, the search result ranker 126 customizes the list of search results originally ordered by their generic ranking scores such that a search result that the user has previously selected (e.g., a search result the user has selected multiple times) or otherwise indicated a preference for is moved to a more prominent position within the list of search results (e.g., a higher position in a webpage displaying the list of search results) and is therefore easier to be noticed by the user. Because different users have different user profiles, they may receive differently ordered lists of search results when submitting the same search query to the information server 106.

While the above description divided tasks among the search engine 122, the search result ranker 126 and the front end server 120 in a particular way, this particular division of tasks is exemplary, and other divisions may be used in other embodiments. In some embodiments, the search result ranker 126 may be merged into the search engine 122. In yet other embodiments, other divisions of tasks may be used.

To serve a list of search results best fit for a particular user, the user's user profile should capture the user's search interests when the user submits a search query. Besides search queries, a user's search interests may be reflected by the websites, domains, particular URLs, or other classification schemes of web pages that the user visits frequently. For example, a user who often visits consumer electronics websites should probably have a user profile that boosts webpages related to consumer electronic products while a user who pays frequent visits to on-line grocery stores should probably have a user profile that promotes webpages relating to grocery stores and cooking. In most cases, a user's search interests vary over time. Accordingly, the user's user profile should be updated from time to time (e.g., periodically) to keep track of the user's current search interests.

As shown in FIG. 1, the user profiler 129 is responsible for generating and maintaining user profiles for users of the information server 106. To capture a user's current search interests, the user profiler 129 may need to access the user's search history that is stored in the search history database 127. A user's search history includes the last N search queries submitted by the user, the "customized" search results responsive to the search queries, the user's activities on the search results collected by the client assistant 134 (e.g., selection of a document link, sometimes called "clicking" on a search result, amount of time spent at a document after selecting the document link, mouse hovering time over a document link, bookmarking a document link, or the like), the current website viewed by the user, the last M websites viewed by the user (where M is a whole number, typically on the order of tens to hundreds), the user's favorite websites, or the like. A more detailed description of a user's search history is provided below in connection with FIG. 2A.

For example, a user's search history may include a timestamp indicating the time that a user submits a search query (t0), a timestamp indicating the time that the user clicks the first URL link in the list of search results (t1), and yet another timestamp indicating the time that the user clicks the second URL link in the list of search results (t2), etc. The differences between two consecutive times (e.g., t1–t0 or t2–t1) are reasonable approximations of the amount of time the user spent viewing the list of search results or the document corresponding to the first URL link that was selected by the user. In some other embodiments (e.g., where at least some users "opt in" to a version of the client assistant that collects additional information about the users' online activities), the user's search history also includes user click and timestamp information for user activities on the document selected by the user.

In some embodiments, the user's search history further includes a timestamp indicating the time that the user submits a second query (t3), a timestamp indicating the time the user clicks a URL link in the second list of search results (t4), and so on. The user's search history may also have data (e.g., a timestamp) recording the time (t5) when the user either closes the browser window that was being used to view search results and documents associated with the search results or navigates away from the search results. At least some of the information above can be used by the user profiler 129 to generate a more accurate user profile for a particular user.

In some embodiments, information use for profiling a user may include the number of "clicks" or visits by the user to a particular website, webpage, or set of websites during a particular window in time. Other characteristics of user behavior that can be used for user profiling include one or more of the following: the length of time that a user interacts with the website, the proportion of the website viewed by the user, actions (in addition to clicks) taken by a user while visiting the website (e.g., printing, bookmarking, cutting and pasting, annotating), and a user's activity subsequent to the interaction with the website.

In some embodiments, a user profile is created based on dated information in the user's search history, with older information receiving lower weights than newer information. For example, the information for each successively older time period may be down-weighted by a predefined scaling factor. Information from a period that is more than N (e.g., a value between 5 and 20) periods old has less than half the impact on the user profile as information from the current period.

Figure 2A:
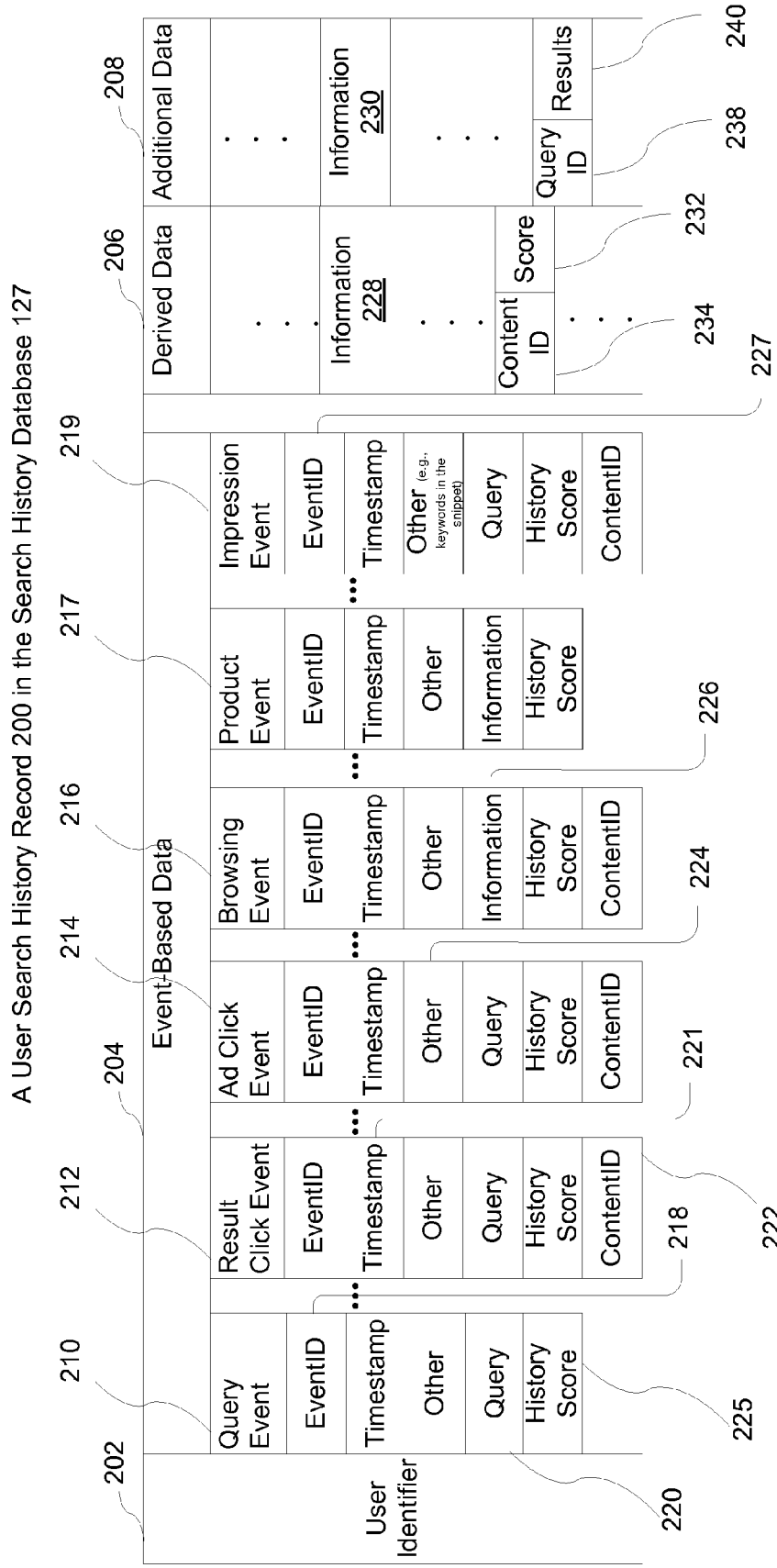

FIG. 2A depicts an exemplary user search history record 200 in the search history database 127 according to some embodiments. In some embodiments, the search history database 127 contains a subset or a superset of the elements depicted in FIG. 2A. The user search history record 200 contains a user identifier 202 that uniquely identifies a particular user. In some embodiments, the user identifier 202 is associated with a particular instance of a client application. In some other embodiments, the user identifier is associated with an actual user. Some of the information that can be associated with a user's search history includes event-based data 204, derived data 206, and additional data 208.

In some embodiments, the event-based data 204 includes: one or more query events 210, one or more result click events 212 (i.e., the URL links presented in a set of search results on which the user has clicked); one or more sponsored link click events 214 (i.e., the sponsored links presented to the user on which the user has clicked); one or more browsing events 216 (e.g., documents that the user has visited after clicking the URL links presented in the search results); one or more product events 217 (e.g., searches for product reviews); and one or more impression events 219 (e.g., displayed search results that may or may not be clicked by the user). In some embodiments, some of the event-based data 204 (e.g., the sponsored link click events 214) is used for user profile generation.

In some embodiments, each type of event-based data 204 includes one or more elements relevant to the event, such as an EventID 218 and a Timestamp 221. The EventID 218 is a unique identifier (e.g., a 64-bit binary number) that is associated with a particular event. The Timestamp 218 is a value (e.g., a 64-bit binary number) that represents the date and/or time at which the particular event record in event-based data 204 was created or at which the particular event occurred.

In some embodiments, one or more of the query events 210, one or more of the result click events 212, one or more of the sponsored link click events 214, and one or more of the impression events 219 include a query portion 220 that includes zero or more query terms associated with the recorded events. Alternately, as shown in FIG. 2A, the query portion 220 for events other than query events may comprise the event ID 227 of a query event instead of a set of query terms.

In some embodiments, one or more of the result click events 212, one or more of the sponsored link click events 214, one or more of the browsing events 216, and one or more of the impression events 291 include a ContentID 222 that identifies the content associated with the particular event. For example, the ContentID 222 in a sponsored link click event 214 represents a unique identifier of the particular sponsored link. For a result click event 212, the ContentID represents the URL link in the search results that has been clicked by the user. For a browsing event 216, the ContentID 222 is a document identifier (e.g., a content fingerprint) that identifies a document that has been browsed by the user. In some embodiments, the ContentID 222 may be used to retrieve a copy of the document from a document repository (e.g., the search engine content database 124).

In some embodiments, one impression event 219 corresponds to a list of search results provided to a requesting user. The list of search results may be displayed all together in a single webpage or divided into multiple sub-lists, each sub-list being displayed in one webpage. Through its associated query event ID 227, an impression event 219 is directly linked to a query event 210 and indirectly linked to zero or more result click events 212, zero or more sponsored link click events 214, and zero or more browsing events 216.

In some embodiments, the event-based data 204 has a history score 225. A particular event's history score 225 may be calculated in multiple ways or combinations thereof. For example, the history score 225 may be a time-based ranking value that may be periodically updated (e.g., decreased) based on a length of time that has elapsed since the event was recorded. In some embodiments, the history score 225 is determined in response to a request instead of being determined during batch or off-line processing. In some embodiments, a particular event having a history score 225 below a threshold may be deleted. In some other embodiments, an event is always kept in a user's search history record regardless of its history score.

In some embodiments, certain information related to a particular event is stored in an "other" field 224 of the event. For example, the other field 224 of the impression event 219 may include the number of search results within a search result list and their positions in the list as well as their associated keywords and text snippet displayed to the user. The other field 224 of the result click event 212 may include a user-selected search result's position in the corresponding list of search results. From these two fields, it is possible to determine the search results above and below the user-selected search result in the search result list.

In some embodiments, the derived data 206 includes one or more information fields 228 containing information derived from the event-based data 204. For example, one information field 228 may represent a user profile that is generated from one or more of the user's query events 210, results click events 212, sponsored link click events 214, browsing events 216, and impression events 219. In some embodiments, the user profile is also stored in the user profile database 128.

In some embodiments, the derived data 206 includes one or more data pairs (ContentID 234, Score 232). The Score 232 represents a ranking score assigned to the content (e.g., a webpage) identified by the ContentID 234. The Score 232 may be dependent upon the number of events (including result click events, sponsored link click events, browsing events, and impression events) associated with the ContentID 234 and generated over a predefined time period. In some embodiments, the Score 232 incorporates a document "dwell time". In some embodiments, the Score 232 incorporates a time since the last user view of the content. In some embodiments, the Score 232 is negatively affected if the user is presented a URL link to the content in a series of search results, but fails to select the URL link. In some embodiments, the Score 232 is positively affected when the user clicks URL links pointing to documents having similar content. Content similarity can be determined by a number of well known techniques (e.g., text classifier, ODP categorization, link structure, URL, edit distance, etc.). In some embodiments, the Score 232 incorporates the number of past search queries from the user for which the content or related content were presented.

In some embodiments, the additional data 208 includes information about the user (e.g., in one or more information fields 230) that is not necessarily represented in the event-based data 204 or the derived data 206. For example, a user may add a few keywords in the user's bookmarks indicating that a particular URL is helpful or pertained to certain information of interest to the user. An information field 230 may identify the keywords and the URL to which it pertains. In some embodiments, a user may indicate certain topics of interest to the user; information identifying such topics may be stored in the information field 230. In some embodiments, a user may modify a ranking score for a particular content (e.g., a URL, a website, or a sponsored link) in an information field 230. In some embodiments, the additional data 208 includes one or more pairs of (QueryID 238, Result 240) that identify search results associated with a particular query. In some embodiments, the Results 240 include "impressions" information, indicating which search results were presented or displayed to the user.

The information server 106 updates the user search history record 200, e.g., after processing a new search query from the user. In some embodiments, there is a predefined amount of storage space for each user search history record 200. If the space has been filled, the search history database 127 may have to evict some old search history data to "make room" for new data. At predefined times, the user profiler 129 is invoked to generate a user profile from a user search history record 200 in the search history database 127. In some embodiments, this process is performed offline. The user profile is then stored in the user profile database 128 and associated with a particular user identifier. In some embodiments, the user profile database 128 may include multiple user profiles associated with the same user identifier. For example, some user profiles are responsible for promoting certain search results that the user is more likely to select, while other user profiles are responsible for demoting certain search results if they are less likely to be chosen by the user.

FIG. 2B is a block diagram illustrating a user profile including a set of user-preferred search results 250. A user-preferred search result is a search result that the user is more likely to select than other search results according to certain predefined criteria (e.g., if the user has selected the search result for at least a minimum number of times during a predefined minimum time period). Each user-preferred search result 250-A, 250-Z has an associated popularity metric indicating its likelihood of being selected by the user. In some embodiments, there is a limit on the number of user-preferred search results that a user can keep at one time. If so, the top P (e.g., 30) search results with highest popularity metrics are selected and stored in the user profile. A more detailed description of determining the popularity metric for a search result is provided below in connection with FIGS. 5 and 6A-6B.

In some embodiments, a user selection of a search result among a list of search results is classified into at least one of four categories as follows:

Click-through: Any user selection of a URL link in a search result is deemed as a "click-through". There is no condition attached to the user's behavior after the click-through. For example, the user may return to the search result webpage after two seconds if the user either clicks the wrong URL link or thinks the search result is no longer interesting.

Long click-through: If a user clicks a URL link to visit a document associated with the URL link and is thought to have stayed with the document for at least a minimum amount of time (e.g., 20 seconds), this click-through is deemed to be a "long click-through". There is no further condition attached to the user's behavior after the user has stayed with the document for the required time period. For example, the user may return to the search result webpage even after one long click-through, e.g., to search for other search results.

Single click-through: If a user clicks a URL link to visit a document associated with the URL link and never returns to the search result webpage, this click-through is deemed as a "single click-through". For example, the user may determine that the document is an exact match of the user's search interests and therefore find no need to look at any other search results. Alternatively, the user may find that the document is completely irrelevant and decide to submit a new search query with updated query terms.

Good click-through: If a user clicks a URL link to visit a document associated with the URL link, stays with the document for at least a minimum amount of time (e.g., 20 seconds), and returns to the search result webpage, this click-through is deemed as a "good click-through". In other words, a good click-through is a combination of a single click-through and a long click-through.

FIG. 2C is a block diagram illustrating a user profile including a set of user-disfavored search results 260. In some embodiments, a user-disfavored search result is a search result that the user is more likely to ignore than other search results according to certain predefined criteria (e.g., if the user has ignored the search result for at least a minimum number of times during a predefined minimum time period, or if the user has ignored the search result on a most recent search query, or if the user has ignored the search result from the same web host or domain name recently, etc.). In some embodiments, it is possible to infer that a search result has been ignored based on the user's interactions with other search results in the same impression. Each user-disfavored search result 260-M, 260-N has an associated unpopularity metric indicating its likelihood of being disfavored by the user. In some embodiments, there is a limit on the number of user-disfavored search results that a user can keep at one time.

As noted above, the user search history record 200 includes one or more impression events 219, each impression event corresponding to a list of search results served to the user. Although the user may not select all the search results in the list, not every user-unselected search result in the list is deemed to be a "user-disfavored" search result. In practice, it is possible that only a subset of the user-unselected search results falls into the category of user-disfavored search results depending on the definition of the term "user-disfavored".

In some embodiments, a search result is deemed as being disfavored once by the user if it appears anywhere in the same impression as a user-selected search result. In some embodiments, a search result is deemed as being disfavored once by the user if it appears above any user-selected search result in the same impression. In some embodiments, a search result is deemed as being disfavored once if it is close to (e.g., adjacent) a user-selected search result in the same impression. In some embodiments, a search result is deemed as being disfavored once if there is a "bad" click-through associated with the search result. A "bad" click-through may occur if the user clicks a URL link in a search result and then rolls back to the search result webpage within a predefined short time period. In some embodiments, a hybrid definition based on the multiple definitions above is used to determine which search result(s) in an impression are disfavored. For example, a search result is deemed as being disfavored for the first time if it appears above any user-selected search result in the same impression. Subsequently, the search result is deemed as being disfavored once as long as it appears anywhere in the same impression as a user-selected search result.

In some embodiments, the user profiler 129 determines the user-disfavored search results 260 by querying the user search history record 200 at real time. For example, before serving a list of search results, the user profiler 129 analyzes the result click events 214 and the impression events 219 that have been collected during the last 30 minutes. Any search result in the impression events 219 that has been ignored for a minimum number of times (e.g., twice) is chosen as a candidate for the user-disfavored search results 260. For each candidate search result, the user profiler 129 determines its unpopularity metric. The top P' (e.g., twenty) search results with highest unpopularity metrics are selected and stored in the user-disfavored search results 260. Note that the aforementioned approach can also be used for selecting one or more user-preferred search results on a short term basis.

Using the set of user-preferred search results 250 and/or the set of user-disfavored search results 260, the search result ranker 126 can re-order a list of search results provided by the search engine 122, which are initially ordered by their respective generic ranking scores.

Figure 3:
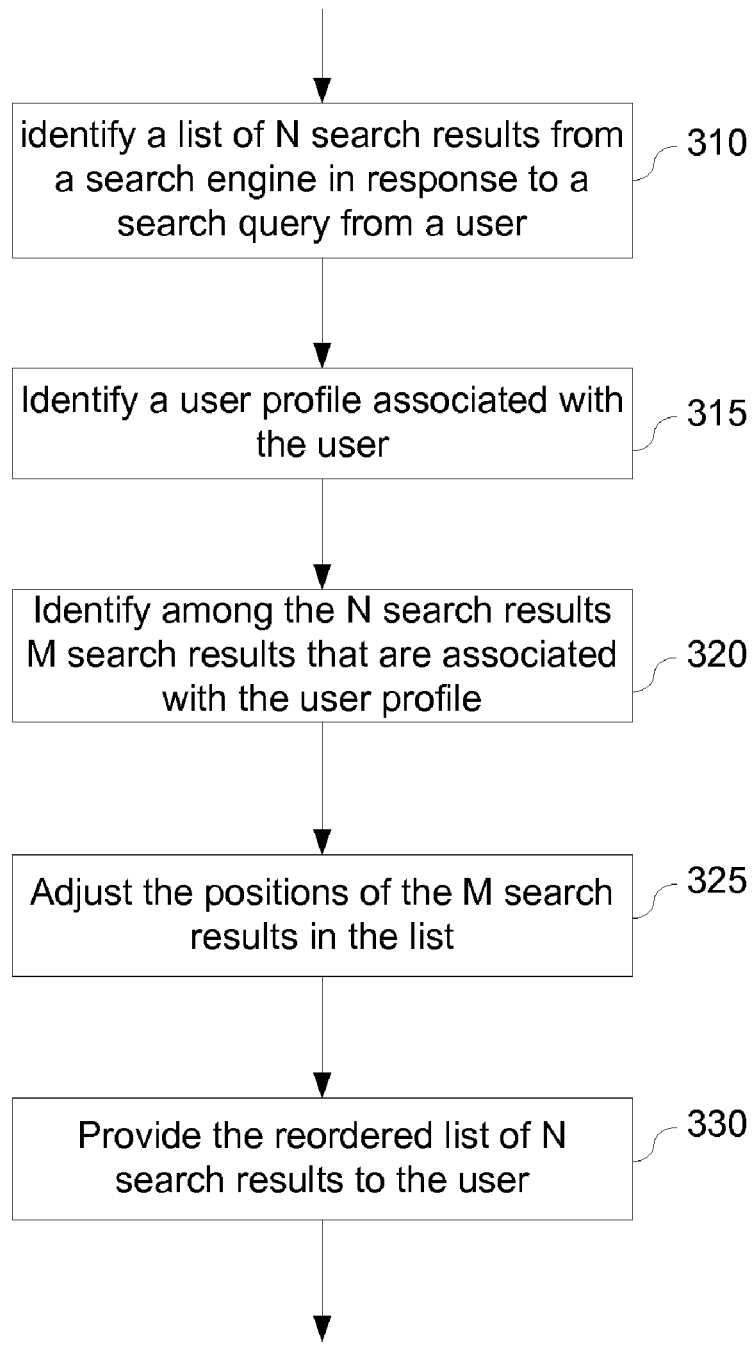
FIG. 3 is a flowchart illustrative of a process for personalizing search results using a user profile in accordance with some embodiments.

FIG. 3 is a flowchart illustrative of a process for personalizing search results using a user profile in accordance with some embodiments. Initially, the search result ranker 126 identifies a list of search results associated with a search query from a user (310). As noted above, the list of search results is produced by the search engine 122 while processing the search query. Each search result in the list has an initial position that is dependent at least in part by the search result's generic ranking score.

Next, the search result ranker 126 identifies a user profile associated with the user (315). In some embodiments, the user may have multiple user profiles, such as a set of user-preferred search results 250 and a set of user-disfavored search results 260. These two sets of search results are selected from the user's search history record 200. In some embodiments, a search result cannot appear in both sets. In some other embodiments, a search result appearing in both sets is treated as a user-preferred search result to avoid removing or demoting a user-preferred search result by accident.

The search result ranker 126 then compares the list of search results with the user-preferred search results 250 and/or the user-disfavored search results 260 to identify M user-preferred search results and/or M' user-disfavored search results associated with each set (320). Note that the number M or M' will vary from one set of search results to another.

In some embodiments, a search result is associated with the user-preferred search results 250 if it is a member of the user-preferred search results 250. In particular, the search result is deemed to be a member of the user-preferred search results 250 if its URL is identical to a URL of one of the user-preferred search results 250. In some embodiments, a search result is associated with the user-preferred search results 250 if it is associated with a source shared by at least one of the user-preferred search results 250. For example, different URLs associated with the same website all include the website's hostname, which is deemed to be the source of the URL. In some embodiments, the user profiler 129 only looks at the hostname of a URL when choosing the user-preferred search results 250 from the user's search history record 200. As a result, any search result whose URL includes one of the user-preferred hostnames is deemed to be associated with the user-preferred search results 250.

Next, the search result ranker 126 adjusts the positions of the M identified user-preferred search results and/or M' user-disfavored search results (325). For example, the search result ranker 126 moves each of the identified search results from its current position determined by its generic ranking score by an offset, based on a presumption that a user-preferred search result near the top of the list is likely to receive more attention from the user while a user-disfavored search result near the bottom of the list is likely to receive less attention from the same user.

In some embodiments, the offset is a constant for the M or M' identified search results. For example, the search result ranker 126 moves each of the M identified user-preferred search results a few positions (e.g., one or two positions) upward in the list and moves each of the M' identified user-disfavored search results a few positions (e.g., one to five positions) downward in the list.

In some embodiments, the offset is a variable that depends at least in part on the popularity metric (or unpopularity metric) associated with each of the M (or M') identified search results. For example, a search result is moved upward/downward by a number of positions proportional to its popularity metric (or unpopularity metric). A search result with a relatively higher popularity metric is moved more positions upward than another one with a relatively lower popularity metric. In some embodiments, the search result ranker 126 multiplies a search result's generic ranking score by its popularity metric (or unpopularity metric) to determine the position offset for the search result.

In some embodiments, the popularity metric of a user-preferred search result is a prediction of the search result's long click-through rate, which indicates the likelihood of a user selection of the search result being a long click-through. For example, a search result having a 7% long click-through rate means that, statistically, for each 100 impressions of the search result, a long click-through will result seven times. By analyzing different users' selections of the search results returned by the information server 106 in response to different search queries, it is possible to determine a "natural" long click-through rate for each position in the list of search results. In this case, the search result ranker 126 compares each identified search result's predicted long click-through rate with the natural long click-through rates at different positions in the list and identifies a position for the search result such that the search result's predicted long click-through rate is higher than the natural long click-through rate at the position immediately following the identified position.

One skilled in the art will find that it is apparent to choose other schemes at least in part based on the popularity metrics (or unpopularity metrics) of the search results.

Finally, the search result ranker 126 provides the reordered list of search results to the user through the front end server 120 (330).

Figure 4:
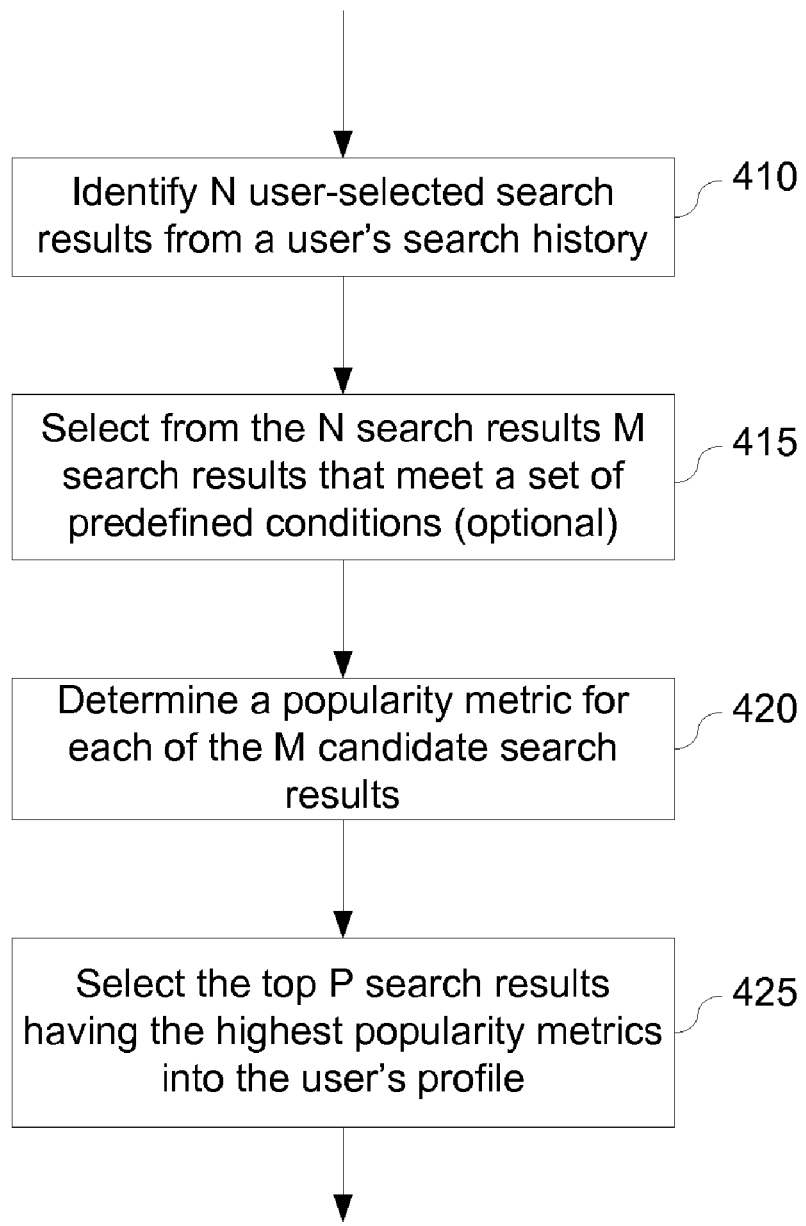
FIG. 4 is a flowchart illustrative of a process for generating a user profile using a user's search history in accordance with some embodiments.

FIG. 4 is a flowchart illustrative of a process for generating a user profile using a user's search history in accordance with some embodiments. For ease of discussion, the follow description focuses on the generation of a user profile including the user-preferred search results 250. One skilled in the art can apply the method described herein to generate other types of user profiles including the user-disfavored search results 260.

Initially, the user profiler 129 queries the user search history record 200 to identify at least a predefined number (e.g., 1000) of user-selected search results (410). A search result is selected once if the use clicks its URL link. In some embodiments, the search results are not aggregated yet such that, if a search result is selected multiple times by the user, each selection corresponds to one of the identified search results. In some embodiments, the search results are already aggregated such that each of the identified search results corresponds to a unique URL or a unique hostname. Alternately, the user profiler 129 identifies as many as N user-selected search results. For example, if the search by the user profiler 129 is limited to click events in the last D days (e.g., 30 days), and the number of click events in that time period is less than N, then fewer than N user-selected search results are identified.

Next, the user profiler 129 selects from the user-selected search results a set of candidate search results that meet a set of predefined conditions (415). For example, only those search results that have been selected by the user at least a minimum number of times (e.g., 4 times) over a period of time spanning at least a predefined minimum length of time (e.g., 3 days) are chosen. Thus, if a search result is selected by a user more than the minimum number of times, but the time span of those selections is less than the minimum length of time, the search result does not meet the set of predefined conditions. The goal of this condition is to ensure that preference be given to search results of relatively long-term interest to a user. In some embodiments, the operation 415 is optional and all of the identified user-selected search results are candidate search results.

For each of the candidate search results, the user profiler 129 determines a popularity metric (420). In some embodiments, the popularity metric of a search result is its predicted long click-through rate. A more detailed description of a method for predicting a search result's long click-through rate is provided below in connection with FIGS. 6A and 6B. In some other embodiments, the popularity metric is a weighting factor that is a function of the user's interactions with the search result. A more detailed description of a method for determining the weighting factor is provided below in connection with FIG. 5.

After assigning each of the candidate search results a popularity metric, the user profiler 129 selects the top P search results having the highest popularity metrics as the user-preferred search results 250 (425). In some embodiments, the user profiler 129 re-computes the set of user-preferred search results 250 from time to time (e.g., periodically) and performs necessary operations to ensure that the user-preferred search results 250 is synchronized with the user's dynamic search interests. Necessary operations include adding new search results that become the user's latest preferences, evicting old search results that are no longer the user's preference, and adjusting the existing search results' popularity metrics to reflect the variation of the user's current search interests in the user-preferred search results.

In some embodiments, the user search history record 200 includes information tracking the user's actions on the user-preferred search results 250. From the information, the user profiler 129 can determine one or more performance metrics for each user-preferred search result, such as its actual long click-through rate and its average click-through position in the list of search results. The fact that a particular search result has a high long click-through rate and a high average click-through position indicates that the search result indeed matches the user's search interests, which serves as a confirmation that the search result should stay within the user-preferred search results 250. In some embodiments, such search results may be further promoted over other user-preferred search results. By contrast, a low long click-through rate may suggest that the search result is not in the user's favor. If many of the user-preferred search results show low performance metrics for a predefined time period, this may imply that the method used by the user profiler 129 for choosing user-preferred search results is not effective and should be replaced with other approaches.

Figure 5:
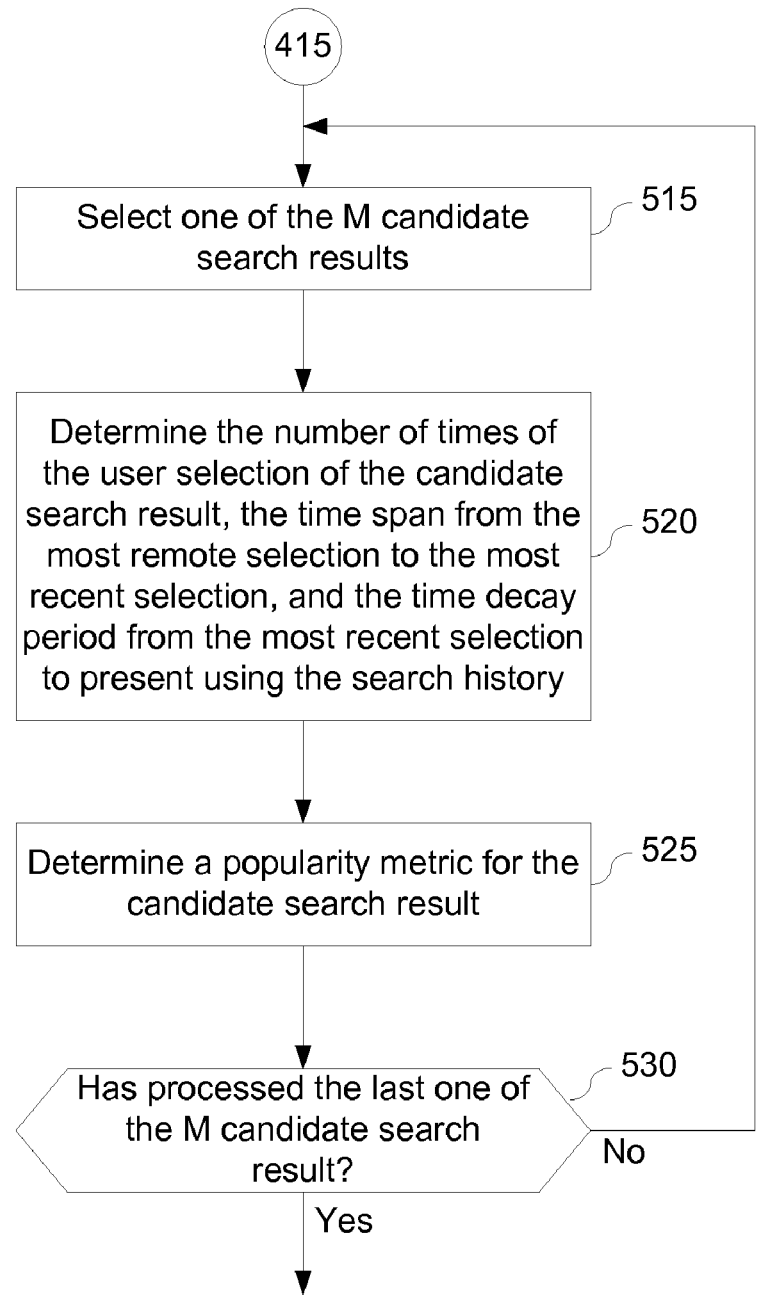
FIG. 5 is a flowchart illustrative of a process for determining popularity metrics for candidate search results in a user's search history in accordance with some embodiments.

FIG. 5 is a flowchart illustrative of a process for determining popularity metrics for candidate search results in a user's search history in accordance with some embodiments. This process corresponds to operation 420 in FIG. 4. Continuing from operation 415 in FIG. 4, the user profiler 129 selects one of the candidate search results (515).

For the selected search result, the user profiler 129 analyzes the user search history record 200 to determine (520) one or more of the following attributes:

click_count: the number of times that the user selected the candidate search result time_span: a time period from the user's first (earliest in time) selection of the candidate search result to the user's most recent selection of the candidate search result; and time_decay: a time period from the user's most recent selection of the candidate search result to present.

In some embodiments, the user profiler 129 uses the following formula including the three attributes to compute a popularity metric for the candidate search result (525):

$$popularity\_metric = f1(click\_count) * f2(time\_span) * f3(time\_decay).$$

The value of "f1( )" increases with an increase of the "click_count" attribute, and decreases with a decrease of the "click_count" attribute, which means that a search result that receives more user selections is given more preference. Similarly, the value of "f2( )" increases with an increase of the "time_span" attribute, and decreases with a decrease in the "time_span" attribute, which means that a series of user selections of a search result over a longer time period is more likely to reflect the user's long-term search interest. But the value of "f3( )" increases with a decrease of the "time_decay" attribute, and decreases with an increase of the "time_decay" attribute, which means that a series of user selections of a search result that is more recent is more likely to reflect the user's current search interest. Each of the functions f1, f2, f3 may be linear or non-linear. One skilled in the art will find many other ways of calculating the popularity metric for a search result using the attributes or the like.

The user profiler 129 iterates through all the candidate search results until the last one of the candidate search results has been processed (530, no).

Figure 6A:
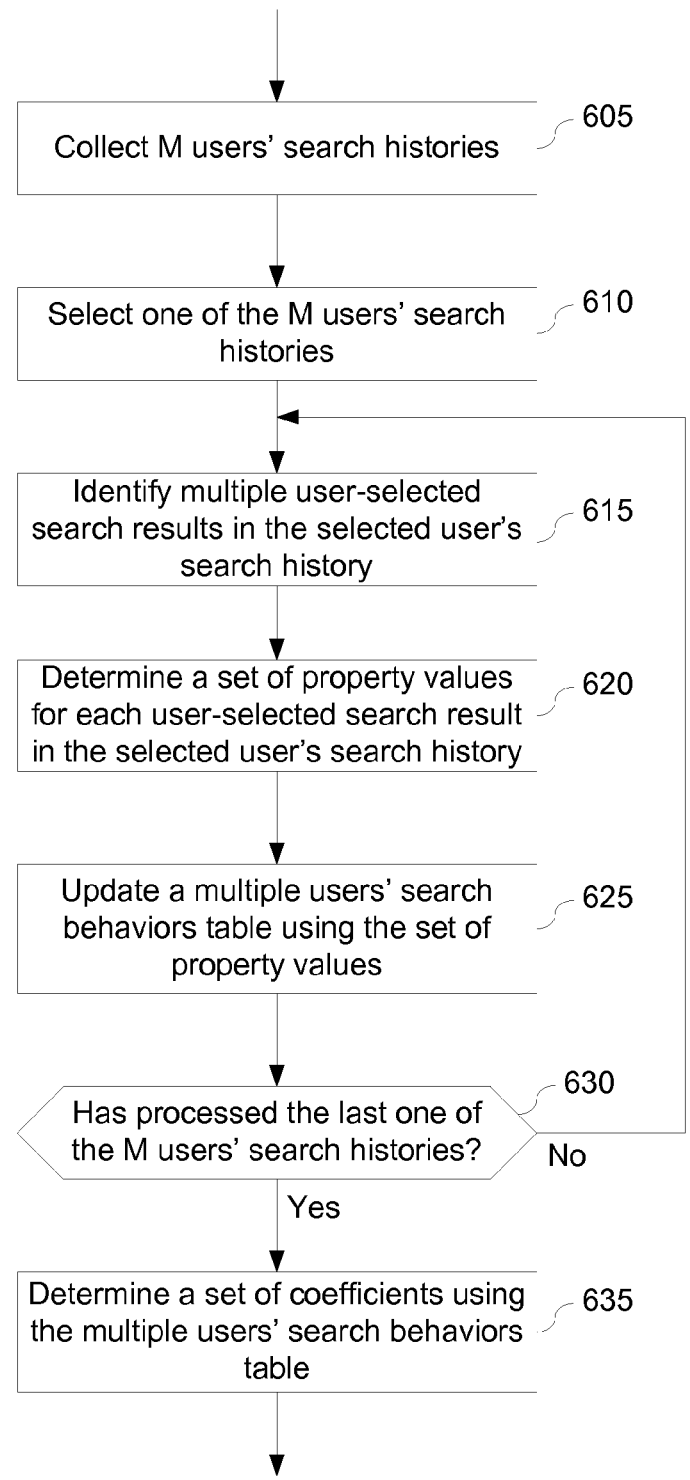
FIGS. 6A and 6B are flowcharts illustrative of a process for determining popularity metrics for candidate search results in a user's search history in accordance with some embodiments.
Figure 6B:
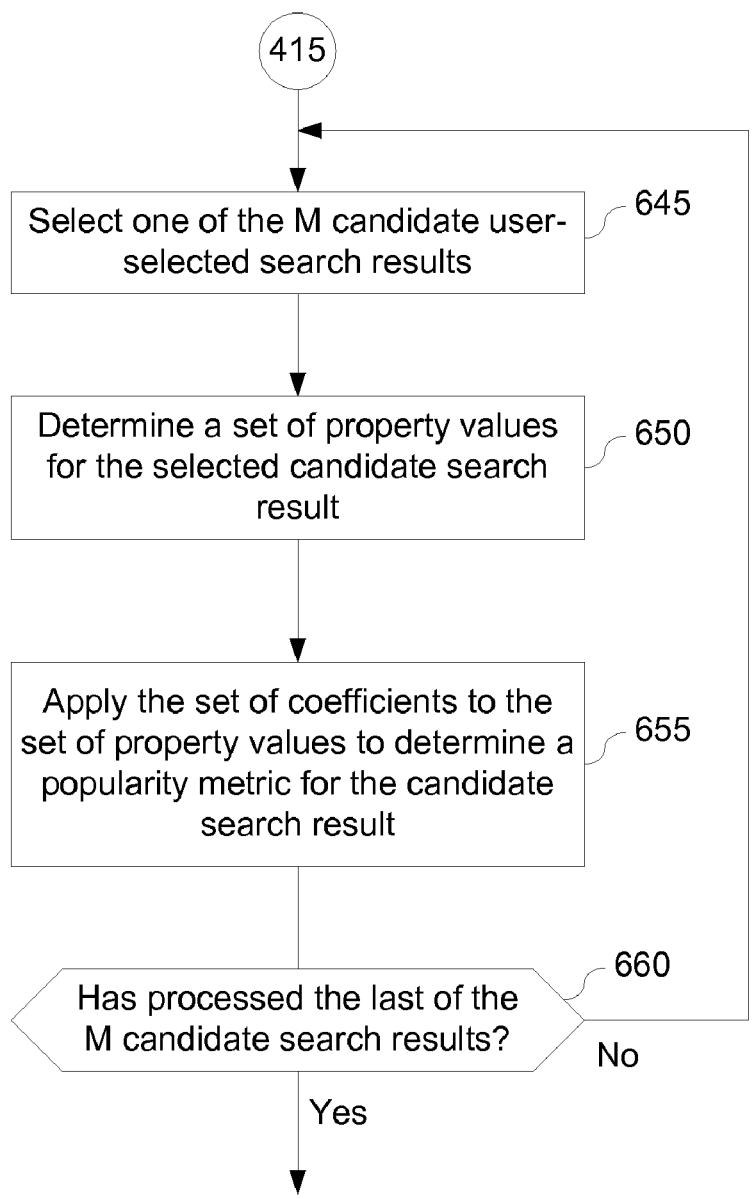

FIGS. 6A and 6B are flowcharts illustrative of a process for determining popularity metrics for candidate search results in a user's search history in accordance with some embodiments. In some embodiments, this process has two sub-processes. The first sub-process (FIG. 6A) is a learning process during which the user profiler 129 generates a model characterizing multiple users' search behaviors using the multiple users' search history records 200 in the search history database 127. This learning process is typically performed offline. The second sub-process (FIG. 6B) is an application process during which the model generated during the first sub-process is applied to a particular user's search history to identify a set of user-preferred search results and compute a predicted long click-through rate for each of the user-preferred search results as its popularity metric. This application process can be performed online or offline.

Referring to FIG. 6A, the user profiler 129 first collects at least a predefined number of users' search histories (605). In some embodiments, each of the users' search histories corresponds to a user search history records 200 in the search history database 127. In some embodiments, the number of users' search histories has to be sufficiently large to produce statistically reliable results. In some embodiments, the user profiler 129 clusters users of the information server 106 into different groups according to their search interests and generates a model for each group of users by applying the learning process to each individual group.

Next, the user profiler 129 selects one of the user search history records (610) and identifies multiple user-selected search results in the user search history record (615). For each identified user-selected search result, the user profiler 129 determines a set of property values (620) and uses the set of property values to populate a multiple users' search behaviors table (625). For illustrative purpose, below is a list of properties that the user profiler 129 checks:

The number of impressions containing the search result;
The number of weeks associated with the impressions;
The number of days after the last impression containing the search result;
The position of the search result in the last impression;
The average position of the search result in the impressions;
The number of click-throughs that the search result has received;
The number of weeks associated with the click-throughs;
The number of days after the last click-through;
The position of the search result associated with the last click-through;
The average position of the search result associated with the click-throughs;
The click-through rate of the search result;
number of long click-throughs that the search result has received;
number of weeks associated with the long click-throughs;
number of days after the last long click-through;
position of the search result associated with the last long click-through;
average position of the search result associated with the long click-throughs;
long click-through rate of the search result;
number of single click-throughs that the search result has received;
The number of weeks associated with the single click-throughs;
The number of days after the last single click-through;
The position of the search result associated with the last single click-through;
The average position of the search result associated with the single click-throughs;
The single click-through rate of the search result;
The number of good click-throughs that the search result has received;
The number of weeks associated with the good click-throughs;
The number of days after the last good click-through;
The position of the search result associated with the last good click-through;
The average position of the search result associated with the good click-throughs; and
The good click-through rate of the search result.

It will be apparent that one skilled in the art may use a subset of the aforementioned properties or choose more properties when populating the table. FIG. 2E is a block diagram illustrating the multiple users' search behaviors table 290. The table includes multiple records 290-1, 290-S, each record having multiple fields corresponding to the properties 1 through R.

Referring back to FIG. 6A, the user profiler 129 iterates through the user search history records 200 until the last one is processed (630, yes). In some embodiments, the user profiler 129 does not aggregate the property values associated with the same search result that is selected by different users. Therefore, the same search result may correspond to multiple records in the table 290. In some other embodiments, the user profiler 129 does aggregate the property values associated with the same search result that is selected by different users such that one search result has only one record in the table 290. But each field has an average value corresponding to the different users that have selected the search result in the past.

Finally, the user profiler 129 determines a set of coefficients from the information in the table 290 (635). The set of coefficients is a model that not only characterizes the multiple users' past search behaviors but can also predict a user's search behavior in the future. There are many well-known machine learning algorithms that can be used to produce the set of coefficients including, but not limited to, logistic regression, artificial neural networks, decision trees, naive Bayes estimation, support vector machines, etc.

As shown in FIG. 6B, this application sub-process is similar to that shown in FIG. 5. Initially, to apply the set of coefficients to a particular user's search history, the user profiler 129 first selects one of the set of candidate user-selected search results for the particular user (645). In some embodiments, each of the set of candidate user-selected search results meets a set of predefined conditions as described above in connection with FIG. 4.

For the selected candidate search result, the user profiler 129 also determines a set of property values (650). This operation is similar to the operation 620 in FIG. 6A. Next, the user profiler 129 applies the set of coefficients to the set of property values to determine a popularity metric for the selected candidate search result (655). In some embodiments, the popularity metric is a predicted long click-through rate for the search result in the future. The user profiler 129 repeats the application process until the last candidate search result is processed (660, yes). As noted above in connection with FIG. 4, the top P search results having the highest predicted long click-through rates are selected as the user-preferred search results.

In some embodiments, a user's search history record 200 may not have a sufficient number of candidate search results to fill the user's user profile. For example, the user may be a new user of the information server 106 and therefore have only a very brief search history. In this case, the user profiler 129 may supplement the user-preferred search results in the user profile from other sources such as other user's user profiles.

Figure 7A:
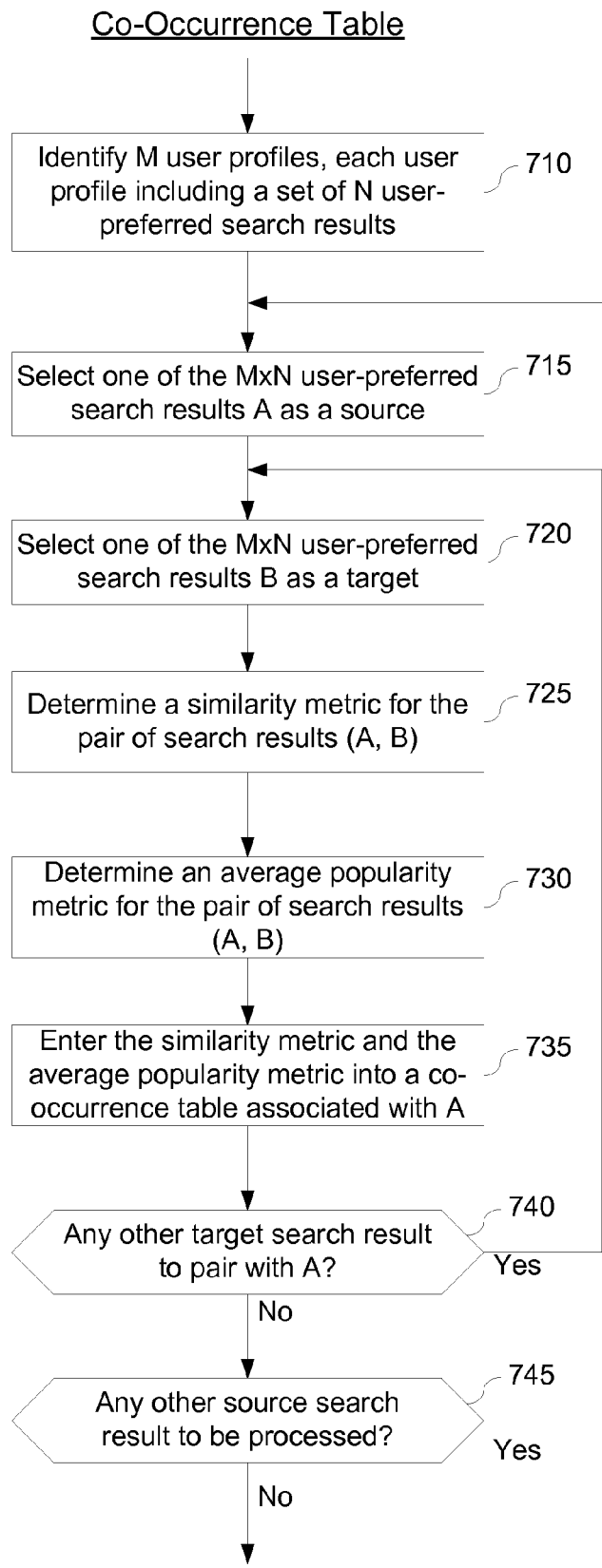
FIGS. 7A and 7B are flowcharts illustrative of a process for selecting relevant search results to supplement a user profile in accordance with some embodiments.
Figure 7B:
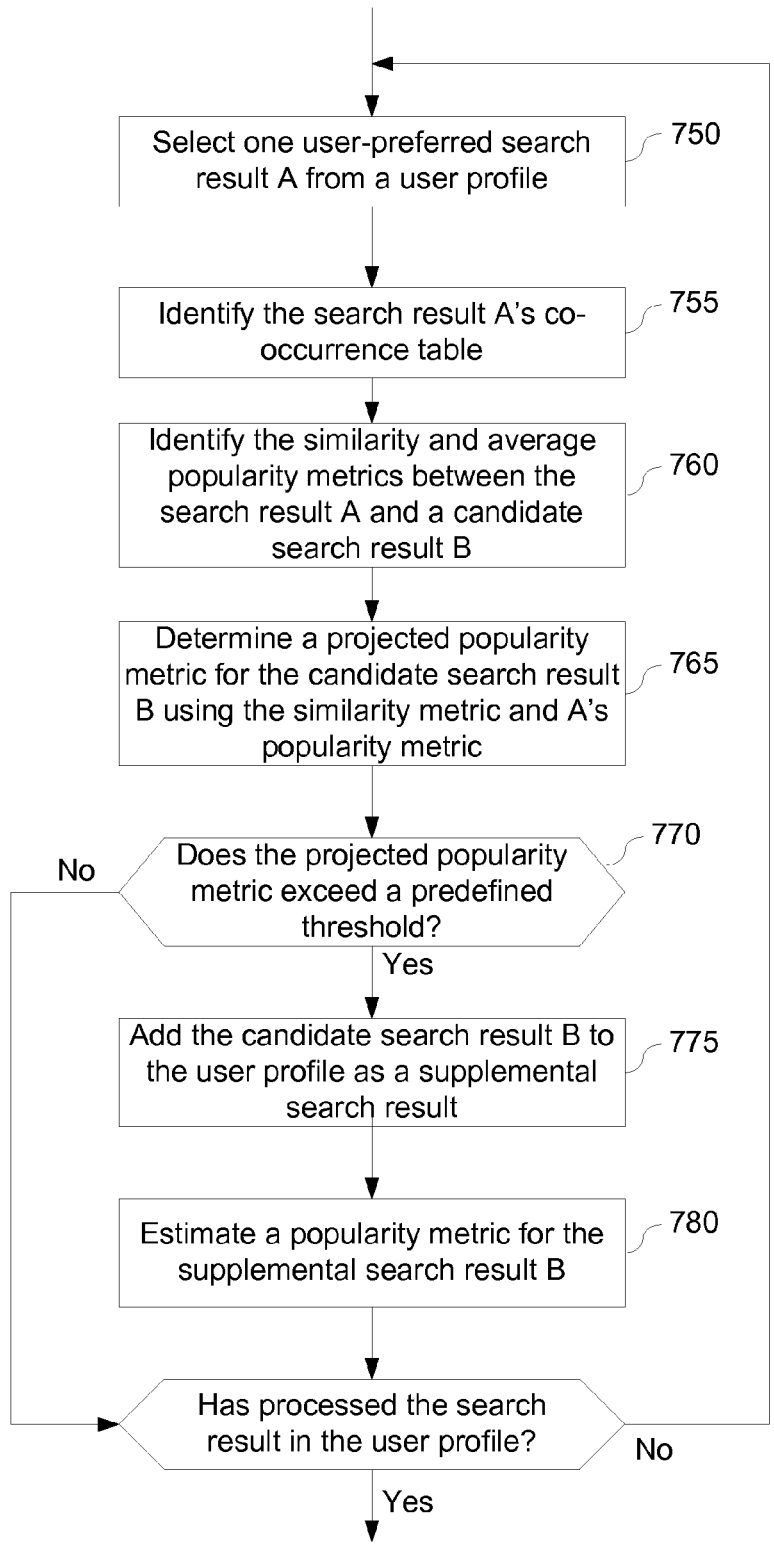

FIGS. 7A and 7B are flowcharts illustrative of a process for selecting relevant search results to supplement a user profile in accordance with some embodiments. In some embodiments, this process can also be divided into two sub-processes. During the first sub-process (FIG. 7A), the user profiler 129 generates multiple co-occurrence tables from multiple users' user profiles, one table for each user-preferred search result appearing in at least one of the user profiles. This sub-process is typically performed offline. During the second sub-process (FIG. 7B), the user profiler 129 supplements a particular user profile using the pre-generated co-occurrence tables. This sub-process may be performed either online or offline.

As shown in FIG. 7A, the user profiler 129 first identifies X user profiles (710). These user profiles may be generated using any of the methods described above in connection with FIGS. 4, 5 and 6A through 6B. An individual user profile may include a set of Y user-preferred search results. Although different user profiles may have different sets of user-preferred search results, some search results often appear in multiple users' user profile. For example, the website "www.cnn.com" may be many users' preferred news source and therefore appears in many users' user profile. For ease of discussion, it is assumed that the X user profiles include totally X by Y user-preferred search results.

The user profiler 129 selects a pair of distinct search results A and B from the X by Y user-preferred search results, designating A as a source (715) and B as a target (720). For the pair of search results (A, B), the user profiler 129 determines a similarity metric (725).

In some embodiments, the similarity metric between the source A and the target B is defined as:

$$similarity\_metric(A,B)=co\text{-}occurrence\_count(A,B)/sqrt(occurrence\_count(A)*(occurrence\_count(B)),$$

wherein co-occurrence_count(A,B) represents the number of times that A and B appear together in the X user profiles, occurrence_count(A) represents the number of times that A appears in the X user profiles, and occurrence_count(B) represents the number of times that B appears in the X user profiles. The similarity metric is analogous to the cosine of two vectors. When the similarity metric between a pair of search results (A, B) has a "high value" (e.g., above a threshold value), this suggests that a user profile that includes one the two search results should probably also include the other one. Note that similarity_metric (A, B)=similarity_metric (B, A).

Next, the user profiler 129 determines an average popularity metric for the pair of search results (A, B) (730). As noted above, each user-preferred search result within a user profile has a popularity metric. In some embodiments, the average popularity metric between the source A and the target B is defined as:

$$average\_popularity\_metric(A,B)=Average(popularity\_metric(B) \text{ in UP-1}, \ldots, popularity\_metric(B) \text{ in UP-S}),$$

wherein UP-1 through UP-S are user profiles that include both A and B, popularity_metric(B) in UP-S represents the popularity metric of B in the user profile UP-S, and "Average" represents the average operation of B's popularity_metric in the user profiles UP-1 through UP-S. In other words, the average_popularity_metric(A, B) represents the average popularity of the target B when the source A is also present in the same user profile. Note that average_popularity_metric (A, B) is usually different from average_popularity_metric (B, A).

Finally, the user profiler 129 enters the two metrics into an entry associated with the target B in a co-occurrence table associated with the source A (735). FIG. 2D is a block diagram illustrative of the co-occurrence table 280 associated with the search result U (i.e., the source). The table 280 includes multiple records 280-T, 280-W, each record including a target search result, a similarity metric between the source and the target and an average popularity metric of the target search result with the presence of the source U.

The user profiler 129 iterates through every unique pair of search results identified in the X by Y search results until all targets have been processed (740, no) and all sources have been processed (745, no).

FIG. 7B is a flowchart illustrating a process of identifying supplemental search results using the co-occurrence tables 280. The user profiler 129 first selects a user-preferred search result A as a source from a user profile (750) and then identifies the search result A's co-occurrence table (755). In some embodiments, the different entries in a co-occurrence table are ordered by their respective similarity metrics from high to low.

The user profiler 129 selects the first entry corresponding to the target B in the table and identifies its similarity metric with A and its average popularity metric with A's presence (760).

Next, the user profiler 129 computes a predicted popularity metric for the target B by multiplying A's popularity metric in the user profile to be supplemented by the similarity metric between A and B (765):

$$projected\_popularity\_metric(B)=popularity\_metric(A)* similarity\_metric(A,B).$$

If the projected popularity metric exceeds a predefined threshold (770), the user profiler 129 then adds the target B to the user profile as a supplemental search result (775). The user profiler 129 also estimates a popularity metric for the supplemental search result B (780). In some embodiments, the popularity metric of a supplemental search result is defined as:

$$estimated\_popularity\_metric(B)=(popularity\_metric(A)*average\_popularity\_metric(A,B)+ \ldots +popularity\_metric(Z)*average\_popularity\_metric(Z,B))/(popularity\_metric(A)+ \ldots + popularity\_metric(Z)),$$

wherein popularity_metric(A), ..., popularity_metric(Z) are the popularity metrics of existing user-preferred search results A, ..., Z in the user profile to be supplemented (note that B is presumed not to be one of the user-preferred search results), and the user-preferred search results A, ..., Z are those with each of which the target B has a projected popularity metric (as defined above) above a threshold. Therefore, if the target B has a projected popularity metric above the threshold with only one source (e.g., the source A) in the user profile, the formula above for the estimated popularity metric is reduced to:

$$estimated\_popularity\_metric(B)=average\_popularity\_metric(A,B).$$

It will be apparent for one skilled in the art to design other types of metrics to measure the similarity between two or more search results and design other algorithms for selecting supplemental search results.

Figure 8:
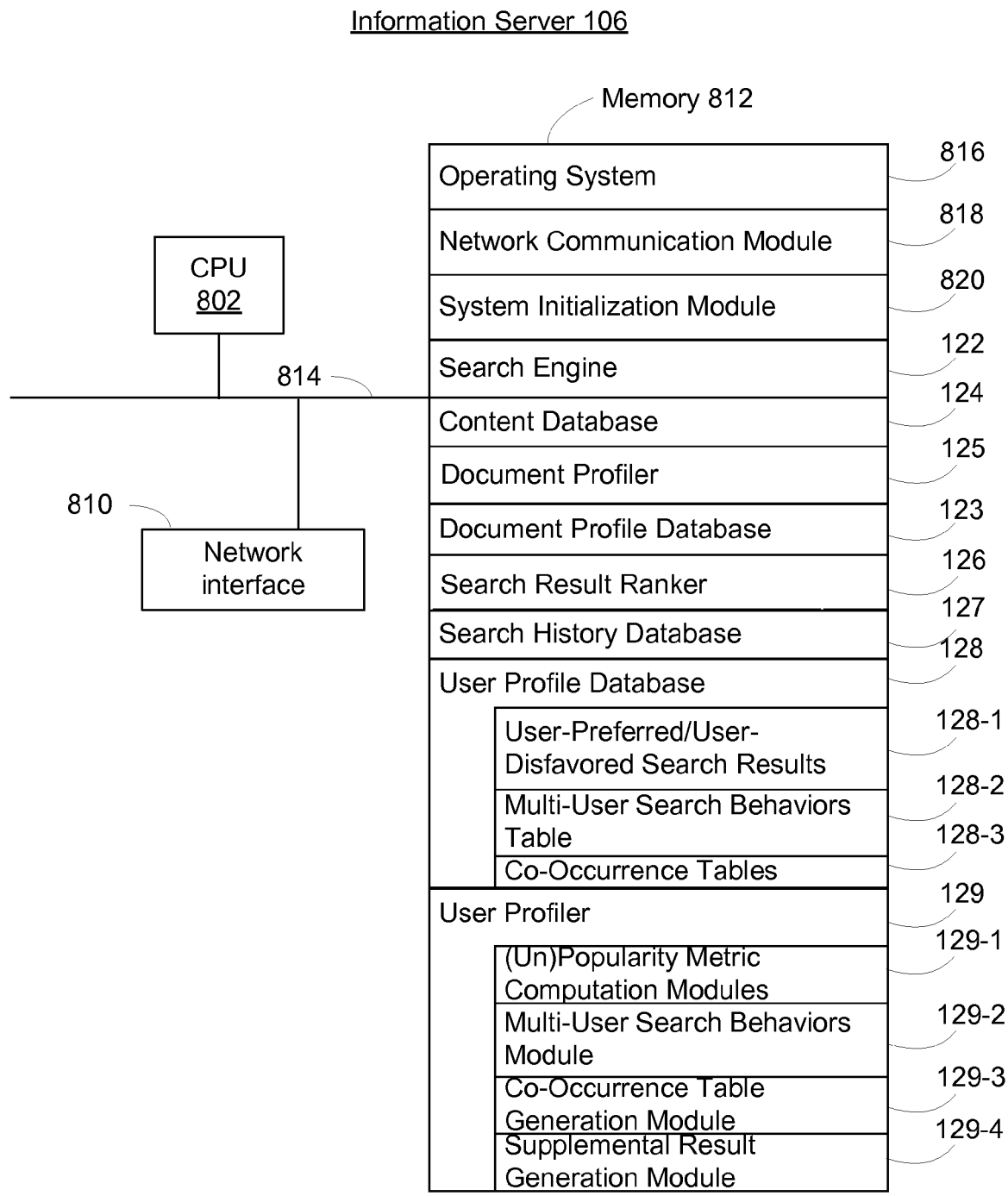
FIG. 8 is a block diagram of an exemplary information server in accordance with some embodiments.

FIG. 8 is a block diagram of an exemplary information server in accordance with some embodiments. The exemplary information server 106 typically includes one or more processing units (CPU's) 802, one or more network or other communications interfaces 810, memory 812, and one or more communication buses 814 for interconnecting these components. The communication buses 814 may include circuitry (sometimes called a chipset) that interconnects and controls communications between system components. The information server 106 may optionally include a user interface, for instance a display and a keyboard. Memory 812 may include high speed random access memory and may also include non-volatile memory, such as one or more magnetic disk storage devices. Memory 812 may include mass storage that is remotely located from the CPU's 802. In some embodiments, memory 812 stores the following programs, modules and data structures, or a subset or superset thereof:

- an operating system 816 that includes procedures for handling various basic system services and for performing hardware dependent tasks;
- a network communication module 818 that is used for connecting the information server 106 to other servers or computers via the one or more communications interfaces 810 and one or more communication networks (wired or wireless), such as the Internet, other wide area networks, local area networks, metropolitan area networks, and so on;
- a system initialization module 820 that initializes other modules and data structures stored in memory 812 required for the appropriate operation of the information server 106;
- a search engine 122 for processing a search query, identifying and ordering a search result according to the search query;
- a content database 124 for storing a plurality of indexed document retrieved from the Internet;
- a document profiler 125 for analyzing a document's content and context and creating a profile for the document;
- a document profile database 123 for storing document profiles associated with different documents stored in the content database 124;
- a search result ranker 126 for re-ordering a list of search results produced by the search engine 122 using one or more user profiles;
- a search history database 127 for storing user search history records associated with different user;
- a user profile database 128 for storing user profiles associated with different users, the user profile database 128 further including user-preferred search results and user-disfavored search results 128-1 for a particular user, a multiple users search behaviors profile 128-2, and co-occurrence tables for each pair of search results 128-3; and
- a user profiler 129 for processing data presenting the online behavior of one or more users and creating and updating one or more user profiles that characterize the search interests of the users, the user profiler 129 further including one or more popularity/unpopularity metric computation modules 129-1, a multiple users search behavior module 129-2, a co-occurrence table generation module 129-3, and a supplemental result generation module 129-4.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of producing personalized search results, performed on a server system having one or more processors and memory storing one or more programs for execution by the one or more processors to perform the method, comprising:
   - identifying a list of search results associated with a search query from a user, wherein each search result has an initial position in the list;
   - identifying a user profile of the user, wherein the user profile includes a set of user-disfavored search results that is determined from the user's search history, wherein the user-disfavored search results include search results identified as user-disfavored search results in accordance with criteria for identifying a subset of search results that have been provided to the user, but not selected by the user;
   - identifying in the list of search results, one or more search results that are associated with at least one of the user-disfavored search results;
   - reordering the list of search results by moving each of the identified search results from its initial position by an offset; and
   - providing the reordered list of search results to the user.

2. The method of claim 1, wherein the set of user-disfavored search results is determined at real time.

3. The method of claim 1, wherein each of the identified search results is a member of the user-disfavored search results.

4. The method of claim 1, wherein each of the identified search results is associated with a source shared by at least one of the user-disfavored search results.

5. The method of claim 1, wherein the offset is a constant for the identified search results.

6. The method of claim 1, wherein the offset is a variable that is a function of an unpopularity metric associated with each of the identified search results.

7. A computer-implemented method of producing personalized search results, performed on a server system having one or more processors and memory storing one or more programs for execution by the one or more processors to perform the method, comprising:
   - identifying a list of search results associated with a search query from a user, wherein each search result has an initial position in the list;
   - identifying a user profile associated with the user, wherein the user profile includes a set of user-disfavored search results that is determined at least in part from the user's search history, wherein the set of user-disfavored search results is determined by:
     - identifying a set of candidate search results, wherein each of the candidate search results has been provided to the user, but without being selected, for at least a predefined minimum number of times;
     - determining an unpopularity metric for each of the candidate search results; and
     - selecting a subset of the candidate search results whose associated unpopularity metrics exceed a predefined threshold as the set of user-disfavored search results;
   - identifying in the list of search results, one or more search results that are associated with at least one of the user-disfavored search results;
   - reordering the list of search results by moving each of the identified search results from its initial position by an offset; and
   - providing the reordered list of search results to the user.

8. The method of claim 7, wherein each of the candidate search results has been provided to the user, but without being selected, for at least the predefined minimum number of times during a time period having at least a predefined minimum duration.

9. The method of claim 7, wherein the unpopularity metric of a candidate search result is a function of one or more parameters including a number of times that the user unselects the candidate search result after being provided, a time span period from the user's most remote unselecting of the candidate search result to the user's most recent unselecting of the candidate search result, and a time decay period from the user's most recent unselecting of the candidate search result to present.

10. The method of claim 7, wherein the unpopularity metric of a candidate search result is determined by:
   determining a model predicting a likelihood of a user unselecting of a search result using multiple users' search histories; and
   applying the model to the user's search history to generate the unpopularity metric of the candidate search result.

11. The method of claim 10, wherein the model is determined by:
   generating a profile that characterizes the multiple users' behaviors over multiple search results in the multiple users' search histories; and
   determining as the model a set of coefficients from the profile, wherein the set of coefficients, when applied to a set of search results associated from a specific user's search history, is configured to predict the likelihood of the specific user's unselecting of each of the search results in the future.

12. A computer system for producing personalized search results, comprising:
   memory;
   one or more processors;
   one or more programs stored in the memory and configured for execution by the one or more processors, the one or more programs including:
      instructions for identifying a list of search results associated with a search query from a user, wherein each search result has an initial position in the list;
      instructions for identifying a user profile of the user, further including instructions for determining a set of user-disfavored search results from the user's search history, wherein the user-disfavored search results include search results identified as user-disfavored search results in accordance with criteria for identifying a subset of search results that have been provided to the user, but not selected by the user;
      instructions for identifying in the list of search results, one or more search results that are associated with at least one of the user-disfavored search results;
      instructions for reordering the list of search results by moving each of the identified search results from its initial position by an offset; and
      instructions for providing the reordered list of search results to the user.

13. The computer system of claim 12, wherein the set of user-disfavored search results is determined at real time.

14. The computer system of claim 12, wherein each of the identified search results is a member of the user-disfavored search results.

15. The computer system of claim 12, wherein each of the identified search results is associated with a source shared by at least one of the user-disfavored search results.

16. The computer system of claim 12, wherein the offset is a constant for the identified search results.

17. The computer system of claim 12, wherein the offset is a variable that is a function of an unpopularity metric associated with each of the identified search results.

18. A computer system for producing personalized search results, comprising:
   memory;
   one or more processors;
   one or more programs stored in the memory and configured for execution by the one or more processors, the one or more programs including:
      instructions for identifying a list of search results associated with a search query from a user, wherein each search result has an initial position in the list;
      instructions for identifying a user profile associated with the user, further including instructions for determining a set of user-disfavored search results at least in part from the user's search history, wherein the instructions for determining the set of user-disfavored search results further include:
         instructions for identifying a set of candidate search results, wherein each of the candidate search results has been provided to the user, but without being selected, for at least a predefined minimum number of times;
         instructions for determining an unpopularity metric for each of the candidate search results; and
         instructions for selecting a subset of the candidate search results whose associated unpopularity metrics exceed a predefined threshold as the set of user-disfavored search results;
      instructions for identifying in the list of search results, one or more search results that are associated with at least one of the user-disfavored search results;
      instructions for reordering the list of search results by moving each of the identified search results from its initial position by an offset; and
      instructions for providing the reordered list of search results to the user.

19. The computer system of claim 18, wherein each of the candidate search results has been provided to the user, but without being selected, for at least the predefined minimum number of times during a time period having at least a predefined minimum duration.

20. The computer system of claim 18, wherein the unpopularity metric of a candidate search result is a function of one or more parameters including a number of times that the user unselects the candidate search result after being provided, a time span period from the user's most remote unselecting of the candidate search result to the user's most recent unselecting of the candidate search result, and a time decay period from the user's most recent unselecting of the candidate search result to present.

21. The computer system of claim 18, wherein the instructions for determining the unpopularity metric of a candidate search result further include:
   instructions for determining a model predicting a likelihood of a user unselecting of a search result using multiple users' search histories; and
   instructions for applying the model to the user's search history to generate the unpopularity metric of the candidate search result.

22. The computer system of claim 21, wherein the instructions for determining the model further include:
   instructions for generating a profile that characterizes the multiple users' behaviors over multiple search results in the multiple users' search histories; and
   instructions for determining as the model a set of coefficients from the profile, wherein the set of coefficients, when applied to a set of search results associated from a specific user's search history, is configured to predict the likelihood of the specific user's unselecting of each of the search results in the future.

23. A computer readable storage medium storing one or more programs to be executed by a computer system, the one or more programs comprising:
instructions for identifying a list of search results associated with a search query from a user, wherein each search result has an initial position in the list;
instructions for identifying a user profile of the user, further including instructions for determining a set of user-disfavored search results from the user's search history, wherein the user-disfavored search results include search results identified as user-disfavored search results in accordance with criteria for identifying a subset of search results that have been provided to the user, but not selected by the user;
instructions for identifying in the list of search results, one or more search results that are associated with at least one of the user-disfavored search results;
instructions for reordering the list of search results by moving each of the identified search results from its initial position by an offset; and
instructions for providing the reordered list of search results to the user.

24. A computer readable storage medium storing one or more programs to be executed by a computer system, the one or more programs comprising:
instructions for identifying a list of search results associated with a search query from a user, wherein each search result has an initial position in the list;
instructions for identifying a user profile associated with the user, further including instructions for determining a set of user-disfavored search results at least in part from the user's search history, wherein the instructions for determining the set of user-disfavored search results further include:
instructions for identifying a set of candidate search results, wherein each of the candidate search results has been provided to the user, but without being selected, for at least a predefined minimum number of times;
instructions for determining an unpopularity metric for each of the candidate search results; and
instructions for selecting a subset of the candidate search results whose associated unpopularity metrics exceed a predefined threshold as the set of user-disfavored search results;
instructions for identifying in the list of search results, one or more search results that are associated with at least one of the user-disfavored search results;
instructions for reordering the list of search results by moving each of the identified search results from its initial position by an offset; and
instructions for providing the reordered list of search results to the user.

25. The computer readable storage medium of claim 24, wherein each of the candidate search results has been provided to the user, but without being selected, for at least the predefined minimum number of times during a time period having at least a predefined minimum duration.

26. The computer readable storage medium of claim 24, wherein the unpopularity metric of a candidate search result is a function of one or more parameters including a number of times that the user unselects the candidate search result after being provided, a time span period from the user's most remote unselecting of the candidate search result to the user's most recent unselecting of the candidate search result, and a time decay period from the user's most recent unselecting of the candidate search result to present.

27. The computer readable storage medium of claim 24, wherein the instructions for determining the unpopularity metric of a candidate search result further include:
instructions for determining a model predicting a likelihood of a user unselecting of a search result using multiple users' search histories; and
instructions for applying the model to the user's search history to generate the unpopularity metric of the candidate search result.

28. The computer readable storage medium of claim 24, wherein the instructions for determining the model further include:
instructions for generating a profile that characterizes the multiple users' behaviors over multiple search results in the multiple users' search histories; and
instructions for determining as the model a set of coefficients from the profile, wherein the set of coefficients, when applied to a set of search results associated from a specific user's search history, is configured to predict the likelihood of the specific user's unselecting of each of the search results in the future.

29. A computer system for producing personalized search results, comprising:
memory;
one or more processors;
one or more programs stored in the memory and configured for execution by the one or more processors, the one or more programs including:
means for identifying a list of search results associated with a search query from a user, wherein each search result has an initial position in the list;
means for identifying a user profile of the user, further including means for determining a set of user-disfavored search results from the user's search history, wherein the user-disfavored search results include search results identified as user-disfavored search results in accordance with criteria for identifying a subset of search results that have been provided to the user, but not selected by the user;
means for identifying in the list of search results, one or more search results that are associated with at least one of the user-disfavored search results;
means for reordering the list of search results by moving each of the identified search results from its initial position by an offset; and
means for providing the reordered list of search results to the user.

* * * * *